United States Patent [19]

Swanson

[11] 4,266,704

[45] May 12, 1981

[54] SHAPED STORAGE BAG

[76] Inventor: Otto W. Swanson, 605 Belmont St., Belmont, Mass. 02178

[21] Appl. No.: 931,180

[22] Filed: Aug. 4, 1978

Related U.S. Application Data

[63] Continuation of Ser. No. 749,015, Dec. 9, 1976, abandoned, which is a continuation of Ser. No. 628,334, Nov. 3, 1975, abandoned.

[51] Int. Cl.³ .................................................. B60R 7/00
[52] U.S. Cl. .............................................. 224/42.46 A
[58] Field of Search ............... 224/42.46 R, 42.46 B, 224/42.45 R, 42.45 A, 42.42 R, 42.42 A, 42.46 A, 29 R, 29 D, 25 A, 8 R, 273; 150/1 R, 52 R, 2, 3, 5, 7; 296/37.15, 37.16; 297/191; 190/52

[56] References Cited

U.S. PATENT DOCUMENTS

| | | | |
|---|---|---|---|
| 1,505,182 | 8/1924 | Wrixton | 224/42.46 R |
| 1,527,056 | 2/1925 | Martin | 224/42.46 B |
| 2,778,553 | 1/1957 | Satrom et al. | 224/42.46 R |
| 2,792,980 | 5/1957 | Brown | 224/8 R |
| 2,925,172 | 2/1960 | Hopp | 224/42.46 R UX |
| 3,014,759 | 12/1961 | Bing | 224/42.46 B UX |
| 3,151,649 | 10/1904 | Mitchell | 224/42.46 R X |

*Primary Examiner*—Robert J. Spar
*Assistant Examiner*—Jerold M. Forsberg
*Attorney, Agent, or Firm*—Wolf, Greenfield & Sacks

[57] ABSTRACT

A shaped storage bag to be mounted on the back of a vehicle seat having a non-vertical overhanging rear surface. The bag includes front, rear, bottom and side panels open at the top and secured together along their adjacent side and bottom edges. The front panel lies substantially in a vertical plane when the bag is closed. An extraction opening is provided in the bottom of one of the side panels to withdraw the bag contents, and the top of the bag is closed by a flap.

7 Claims, 5 Drawing Figures

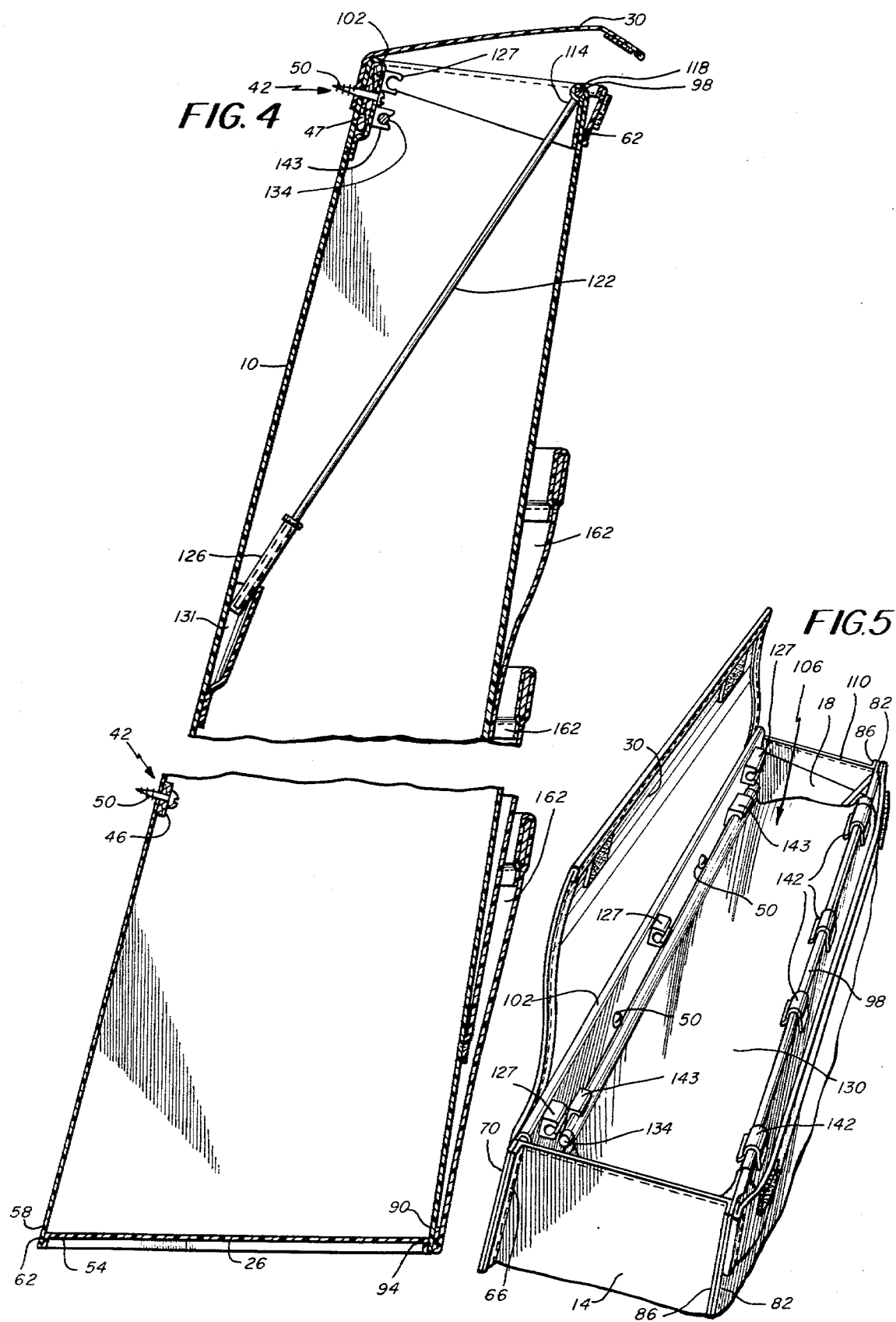

SHAPED STORAGE BAG

This is a continuation of application Ser. No. 749,015, filed Dec. 9, 1976, now abandoned, which in turn is a continuation of prior application Ser. No. 628,334 filed Nov. 3, 1975, now abandoned.

SUMMARY AND BACKGROUND OF THE INVENTION

The present invention relates to shaped storage bags, more particularly it relates to storage bags suitable to be mounted on overhanging surfaces such as the back of vehicle seats.

As recreational vehicles such as van conversions or campers are often used for long trips by several persons space in them is at a premium. The reason for this of course is the requirement of carrying food and clothing enough for extended trips for all the passengers in the recreational vehicle. Further, there is a need to have a space set aside for rubbish generated by the use of such a vehicle. Moreover, the requirement for separate facilities to store soiled laundry and clean clothing further strains the space capacity of these recreational type vehicles.

The present invention is designed to make available for storage purposes space which until now had not been thought usable for such purposes. The space in question is that vertically below the back of the front seats of the recreational vehicles. These seats have overhanging back surfaces because of comfort requirements of riders sitting in them. The storage bag of the present invention is to be mounted on the back of such a seat and because of its generally triangular shape when closed, the bag does not extend beyond the vertical line extending downward from the top of the seat. Riders in the rear seats are not inconvenienced by the presence of the bag and considerable storage space is provided in them. The bag may extend down to the floor of the van or camper or it may go down to some level above the floor so that passengers in the rear seats of the vehicles may have space to place their feet.

It should be clear that although we have made reference to the use of this bag in recreational vehicles, its use is advantageous whenever there is an overhanging surface near to which it is desirable to store things. For example, the storage bag may be used in the area under a peaked roof in a building.

One object of the present invention is to provide a storage bag mountable upon a non-vertical overhanging surface.

Another object of the present invention is to provide a shaped storage bag having, when closed, a generally triangular shape defined by the overhanging surface, its bottom and a vertical side.

A further object of the present invention is to provide a shaped storage bag which makes available for storage use the space vertically below a non-vertical overhanging surface.

An additional object of the present invention is to provide a shaped storage bag which can be used with a disposable liner.

Another object of the present invention is to provide a shaped storage bag with an extraction opening near its wide bottom so that the filled liner may be easily removed from the bag.

Still another object of the present invention is to provide a shaped storage bag which can provide even further space for storage when the panel opposite the non-vertical overhanging surface is allowed to extend away from that surface leaving the bag in an open position.

Still a further object of the present invention is to provide a storage bag having outside pockets for the placement of sundry items such as magazines, newspapers and the like.

Another object of the present invention is to provide a shaped storage bag having means to secure a disposable liner used therewith to the upper portions of the bag to prevent collapse thereof.

A further object of the present invention is to provide a shaped storage bag having stiffening means to prevent the bag from sagging.

Still a further object of the present invention is to provide a shaped storage bag suitable for use for carrying a variety of different items such as soiled laundry and rubbish in a recreational vehicle.

To accomplish these and other objects the storage bag of the present invention has among its features a rear panel which may be mounted by mounting means to an overhanging non-vertical surface, a bottom panel and a front panel having appropriate dimensions so that when the bag is in its closed configuration the front panel hangs vertically downward so that the bag takes up only the space vertically below the non-vertical overhanging surface. The shaped storage bag also includes a front rod interconnected with the front panel to maintain the shape thereof. There are also provided with this invention clips and clamps which can be used to secure a disposable liner bag in the shaped storage bag to the top of the front and rear panels. The shaped storage bag also has releasable locking means to secure the bag in its closed configuration when material is not being placed therein.

The storage bag of the present invention has slits located along the bottom and a side of one of the side panels which are closable by a zipper. These slits which meet near the corner of the side panel provide an extraction opening through which a filled liner bag may be removed from the shaped storage bag. Removal of the disposable liner bag in this fashion is convenient particularly because the shaped storage bag has a relatively narrow upper opening.

The shaped storage bag of the present invention also has a top flap which can be brought down over the front panel when the storage bag is in its closed configuration and can be folded back to expose the upper opening of the storage bag when it is desired to open it.

Another feature of the present invention is the provision of pockets on the outside of the front panel for carrying magazines, newspapers and the like. Such capacity is especially useful when the bag of the present invention is used in a recreation vehicle such as a camper or converted van.

These and other objects and features of the invention along with its incident advantages will be better understood and appreciated from the following detailed description of one embodiment thereof selected for purposes of illustration and shown in the accompanying drawings.

BRIEF FIGURE DESCRIPTION

FIG. 4 is a side cross-sectional fragmented view of the shaped storage bag shown in FIGS. 1–3 taken along the line 4—4 of FIG. 2.

FIG. 5 shows a more detailed view of the top of the shaped storage bag when the latter is in its open configuration and particularly showing the clips and releasable clamps holding a liner bag securely in the storage bag.

DETAILED FIGURE DESCRIPTION

Figure 1:
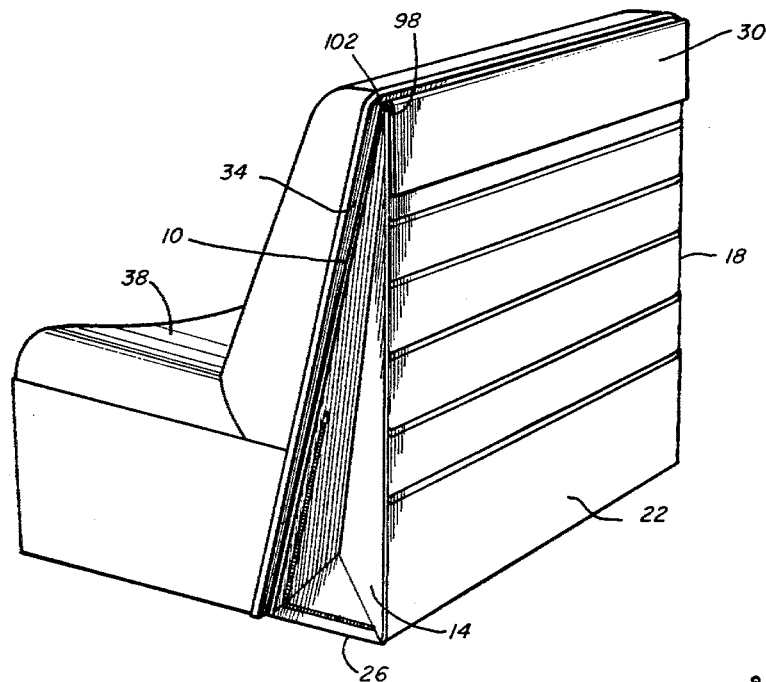
FIG. 1 shows a perspective view of a shaped storage bag constructed according to the present invention mounted on the back of a seat. The bag is shown in its closed configuration with the top flap folded down over the front panel.
Figure 2:
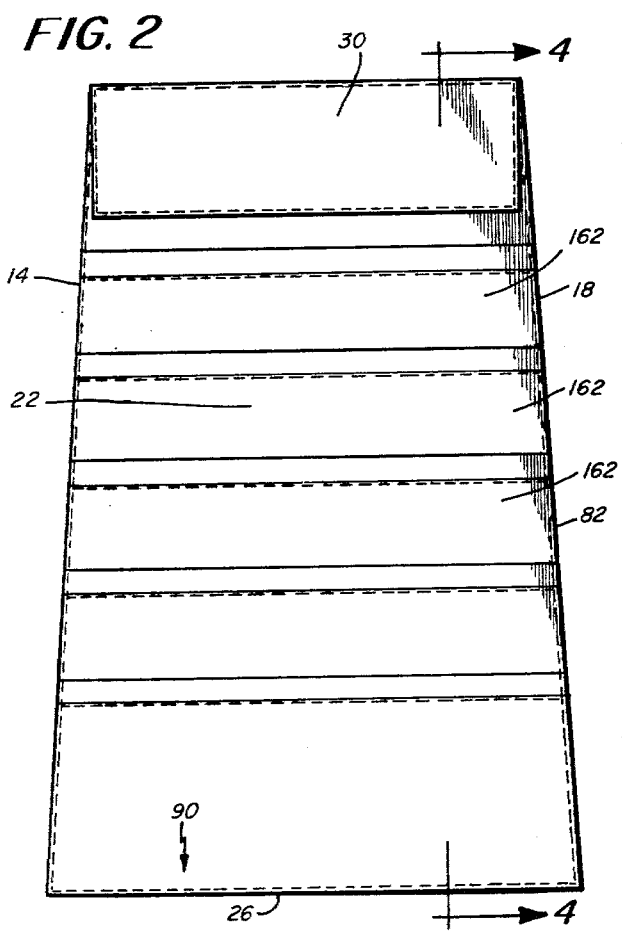
FIG. 2 is a view of the shaped storage bag from the rear of the seat and particularly showing the front panel with the pockets located thereon.

The shaped storage bag shown in FIGS. 1–5 which is just one embodiment of the present invention generally comprises a rear panel 10, a first side panel 14, a second side panel 18, a front panel 22, a bottom panel 26, and a top flap 30.

The rear panel 10 is secured to a non-vertical overhanging surface 34 which is shown in the Figures as the back of a vehicle seat 38. This panel 10 is fastened to the overhanging surface 34 by mounting means 42 which in the present embodiment comprise blocks 46, strip 47 and screws 50 which thread through the strip and blocks, and the rear panel into the seat back which constitutes the overhanging surface 34. The blocks and strips may be made of metal, wood or any sufficiently strong material. The rear panel 10 is thus retained flush against the non-vertical overhanging surface 34.

The bottom panel 26 is interconnected at its back edge 54 with the rear panel at its lower edge 58 by stitching 62. It should be obvious that other means of interconnecting the panels such as gluing are suitable for use in the present invention. The first side panel 14 and the second side panel 18 are interconnected along their back edges 66 with the rear panel at its side edges 70. The side panels 14 and 18 are also interconnected at their bottom edges 74 with the bottom panel 26 at its side edges 78. The front panel is interconnected at its side edges 82 with the side panels 14 and 18 at their front edges 86; it is also interconnected at its bottom edge 90 with the front edge 94 of the bottom panel 26.

Figure 3:
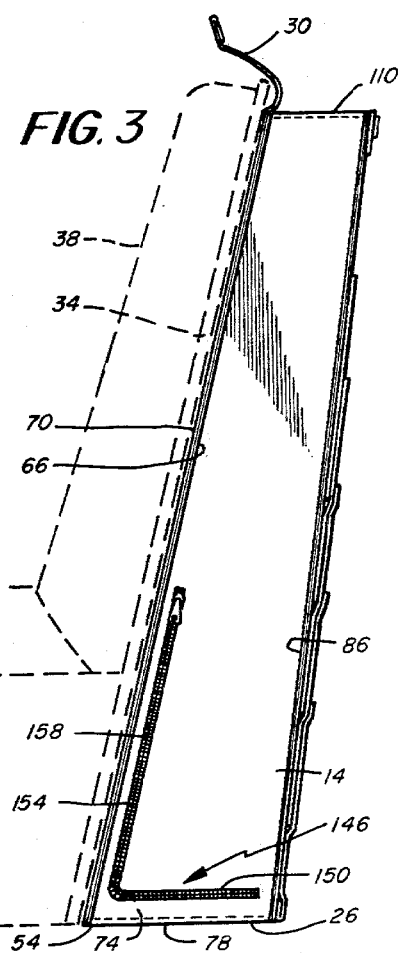
FIG. 3 shows a side view of the shaped storage bag shown in FIG. 1 in its open configuration.

The shaped storage bag is in its closed configuration shown in FIG. 1 when the upper edge 98 of the front panel 22 is in close contiguity with the top edge 102 of the rear panel 10. The side panels 14 and 18 must be formed of flexible material so that the storage bag may be brought from its closed configuration to the open position shown in FIG. 3. When the bag is in the open configuration, as shown in FIGS. 3 and 5, an upper opening 106 of the storage bag is defined by the upper edge 98 of the front panel, the top edge 102 of the rear panel and the top edges 110 of the side panels 14 and 18.

The bottom panel 26 has a width, equal to the length of one of its side edges 78, such that when the storage bag is in its closed configuration, as shown in FIG. 1, the front panel 22 is in a substantially vertical plane. In this configuration the bag has generally the shape of a right triangle. The top flap 30 is interconnected with the rear panel at its top edge 102 and may be positioned down over the front panel 22 when the bag is in its closed position. The flap is pulled back over the top of the vehicle seat 38 when it is desired to bring the shaped storage bag into its open configuration as shown in FIG. 3.

In the embodiment of the present invention shown in the Figures all of the panels and the top flap are made from a flexible material such as vinyl or other plastic. (Other embodiments of this invention of course do not need to have flexible rear panels, front panels or bottom panels.) The stiffening means comprising, in the present embodiment, a front rod 114 which has a central section 118 and two identical side sections 122 each extending in the same plane perpendicular to the center section 118, prevents the sagging of the flexible front panel 22. The front panel 22 is interconnected with the front rod 114 by being folded over the central section 118 of the rod and being secured to itself by stitching 62, as is best shown in FIG. 4. The distal ends 126 of the front rod 114 are positioned in slots 131 located on the inside of the rear panel 10. This form of support for the front rod 114 allows it to move backward and forward so that the storage bag may be moved from its closed configuration to its open configuration. It should be noted that when the bag is in its closed configuration the sides 122 of the front rod lie flush against the upper portion of the rear panel 10 and guarantee that the upper edge 98 of the front panel 22 is at essentially the same vertical level as the top edge 102 of the rear panel 10. Also because the central section 118 threads through the fold formed in the front panel all along the upper edge the front panel 22 cannot sag.

The storage bag has releasable locking means as follows:

located on and riveted to the wood strip 47 are releasable first clamps 127. These clamps are positioned just below the top edge 102 of the rear panel 10. When the front panel is brought back to close the bag, the front rod 114 with the upper portion of the front panel folded thereover, snaps into the clamps 127 so that the shaped storage bag remains shut until the rod is pulled away by a user wanting to gain access to the inside of the bag.

It is desirable to use the storage bag with a disposable liner bag 130 so that the storage bag will not be soiled by rubbish or soiled laundry placed therein. Securing means are provided to hold the upper portion of the liner bag in place. These securing means comprise the back rod 134, clips 142, and releasable clamps 143. When a disposable liner bag 130 is placed in the shaped storage bag the upper rear portion of the liner bag is folded over the back rod 134 and the upper front portion of the liner bag is folded over the central section 118 of the front rod 114 which is folded into the front panel as previously described. The back rod, with the liner bag folded over, is now snapped into the releasable second clamps 143 which are riveted to the strip 47 just below releasable clamps 127. The clips 142 secure the liner bag to central section 118 of the front rod as is best shown in FIG. 5. When the liner bag 130 is full the clips 142 are withdrawn and the back rod 134 is snapped out of the clamps 143 and removed. The liner bag 130 may now be taken out of the shaped storage bag and replaced by a fresh one.

The storage bag as shown in the Figures has, when it is in its open configuration as shown in FIG. 3, an upper opening 106 which has a width equal to the length of the top edge 110 of the lower part of the storage bag (equal to the length of the side edge 78 of the bottom panel 26). Because of this feature, there is some difficulty in removing a filled liner bag from the shaped storage bag through the upper opening. To facilitate the removal of a filled liner bag an extraction opening 146 is provided in the first side panel 14. This opening comprises a bottom slit 150 and a side slit 154. The bottom slit is immediately adjacent the bottom extremity 74 of the first side panel 14. Meeting the bottom slit 150 at its end is the side slit 154 which runs part way up the side panel 14 immediately adjacent the back edge 66 of that panel. A closure means, in the present embodiment comprising a zipper 158, is located in and can be used to open and close the extraction opening 146. The zipper of course could run to the top of the bag if desired. When the liner bag is full and made ready for removal as described above, the zipper is opened and the liner bag may be easily removed from the extraction opening which is large enough to permit the bottom of the full liner bag of width substantially equal to that of the bottom of the shaped storage bag to pass through it unimpeded.

As all panels of the shaped storage bag are made of flexible material, the bag when empty can be folded back next to the overhanging surface 34 out of the way of passengers in the rear seat of a van conversion or camper in which the bag is located.

As a further advantageous feature the bag shown in the Figures has pocket means 162 located on the outside of the front panel 22 and interconnected therewith by stitching 62. Of course other pocket means could be provided on the side panels as well, or even on the top flap but these are not shown in the embodiment under description. These pocket means 162 may be used by the passengers in the rear seat of the vehicle, in which the bag is placed, to store such items as magazines, newspapers and the like.

This embodiment of the present invention is particularly convenient for use in recreational vehicles such as van conversion or campers. It takes advantage of and makes available for storage the space lying vertically below the overhanging surface which constitutes the back of the front seats of the vehicle. When used with a liner bag, this storage bag becomes most convenient for the storage of rubbish which accumulates during long trips and also for the storage of soiled laundry which must be segregated from clean clothing. When the liner bag is filled with rubbish it may simply be removed through the extraction opening and discarded without further processing. Similarly laundry may be kept in the liner bags which have been removed from the extraction opening until opportunity is available to clean the laundry.

Because various modifications may be made of this invention without departing from its spirit it is not intended that the breadth of this invention be limited by the single embodiment described above. Rather it is intended that the scope of this invention be determined by the appended claims and their equivalent.

What is claimed is:

1. A shaped storage bag, to be mounted on the back of a vehicle seat having a non-vertical, overhanging surface, having an inside and an outside and comprising
   a rear panel, a front panel, a bottom panel, first and second side panels, a top flap, mounting means, stiffening means, and releasable locking means;
   said mounting means fastening said rear panel to said overhanging surface;
   said rear panel, said front panel, said first and second side panels, and said bottom panel being interconnected with one another at their adjacent edges, but with the upper edge of said front panel and the top edges of said side and rear panels being free of one another;
   said first and second side panels being flexible so that said upper edge of said front panel may be moved into contiguity with said top edge of said rear panel to bring said storage bag into its closed configuration or may be moved away from said top edge, in a substantially horizontal direction, to bring said storage bag into its open configuration,
   said front panel lying, when said storage bag is in said closed configuration, in a substantially vertical plane and extending down to its interconnection with said bottom panel substantially directly below said top edge of said rear panel;
   said storage bag having, when in said open configuration an upper opening defined by said top edges of said first and second side panels and said rear panel and the upper edge of said front panel;
   said stiffening means comprising a rigid front rod;
   said front rod being interconnected with said rear panel and said front panel to maintain said upper edge of said front panel in close vertical contiguity with said top edge of said rear panel when said bag is in its closed orientation;
   said top flap being flexibly interconnected at its rear to said rear panel adjacent its top edge so that it can be swung down over the upper edge of said front panel when said bag is in its closed configuration and can be displaced back behind said top edge of said rear panel to allow said bag to be brought to its open configuration;
   said releasable locking means being interconnected with said rear panel to releasably maintain said upper edge of said front panel in horizontal contiguity with said top edge of said rear panel when said bag is in its closed configuration,
   said first side panel having an extraction opening, allowing extraction of the contents of said storage bag, located at least in part adjacent the bottom edge of said first side panel;
   and said first side panel having closure means for opening and closing said extraction opening,
   securing means for removably securing a flexible liner bag in said storage bag;
   said securing means comprising a rigid back rod, at least one second clamp, and at least one clip;
   said second clamp being interconnected with said rear panel;
   said liner bag being folded over said back rod and being yieldably maintained by said second clamp;
   said back rod being inside said storage bag and with said liner bag, adjacent and substantially parallel to said top edge of said rear panel;
   said liner bag being folded over said front rod where it interconnects with said front panel so as to bring the opening of said liner bag in substantial coincidence with the opening of said storage bag defined by said upper edge of said front panel, said top edge of said rear panel and said top extremities of said first and second side means;
   at least one of said clips being removably clamped over said front rod where it interconnects with said front panel with the liner bag folded thereover in order to secure said liner bag thereto.

2. A shaped storage bag as described in claim 1 further characterized by
   said front rod having a central section and two identical side sections extending in the same direction from either end of said central section and substantially perpendicular thereto;

said central section being interconnected with said front panel adjacent and substantially parallel to its upper edge to prevent sagging thereof;

said central section having a length slightly less than said upper edge of said front panel;

said front rod interconnecting at the distal ends of said side sections with said rear panel adjacent to its side edges so that said rod can be moved to allow the upper edge of said front panel to be moved away from or toward said top edge of said rear panel to open and close said shaped storage bag;

said releasable locking means comprising at least one first clamp yieldably closable about said front rod.

3. A shaped storage bag as described in claim 1 further characterized by said top edge of said rear panel having a length less that said lower edge of said rear panel so that said rear panel can conform to a similarly shaped overhanging surface;

said back and front edges of said bottom being of substantially the same length as said lower edge of said rear panel;

said bottom edge of said front panel being substantially the same length as said lower edge of said rear panel and said upper edge of said front panel being of substantially the same length as said top edge of said rear panel.

4. A shaped storage bag as described in claim 1 further characterized by said extraction opening comprising first and second slits, said first slit being parallel to and immediately adjacent the lower edge of said first side panel, said second slit being located parallel to, at the lower end of, and immediately adjacent the back edge of said first side panel, said first and second slits joining each other adjacent the corner defined by the back and bottom edges of said first side panel, said closure means comprising at least one zipper.

5. A shaped storage bag as described in claim 1 further characterized by at least one pocket means located on the outside of said front panel.

6. A shaped storage bag to be mounted on the back of a vehicle seat having a non-vertical, overhanging surface, having an inside and an outside and comprising a rear panel, a front panel, a bottom panel, first and second side panels, a top flap, mounting means, stiffening means, and releasable locking means;

said mounting means fastening said rear panel to said overhanging surface;

said rear panel, said front panel, said first and second side panels, and said bottom panel being interconnected with one another at their adjacent edges, but with the upper edge of said front panel and the top edges of said side and rear panels being free of one another;

said first and second side panels being flexible so that said upper edge of said front panel may be moved into contiguity with said top edge of said rear panel to bring said storage bag into its closed configuration or may be moved away from said top edge, in a substantially horizontal direction, to bring said storage bag into its open configuration;

said front panel lying, when said storage bag is in said closed configuration, in a substantially vertical plane and extending down to its interconnection with said bottom panel substantially directly below said top edge of said rear panel;

said storage bag having, when in said open configuration an upper opening defined by said top edges of said first and second side panels and said rear panel and the upper edge of said front panel;

said stiffening means comprising a rigid front rod;

said front panel being interconnected with said rear panel and said front panel to maintain said upper edge of said front panel in close vertical contiguity with said top edge of said rear panel when said bag is in its closed orientation;

said top flap being flexibly interconnected at its rear to said rear panel adjacent its top edge so that it can be swung down over the upper edge of said front panel when said bag is in its closed configuration and can be displaced back behind said top edge of said rear panel to allow said bag to be brought to its open configuration;

said releasable locking means being interconnected with said rear panel to releasably maintain said upper edge of said front panel in horizontal contiguity with said top edge of said rear panel when said bag is in its closed configuration;

one of said panels having an extraction opening, allowing extraction of the accumulated contents of said storage bag, located at least in part adjacent the bottom;

closure means for opening and closing said extraction opening;

securing means for removably securing a flexible liner bag in said storage bag;

said securing means comprising a rigid back rod at least one second clamp, and at least one clip;

said second clamp being interconnected with said rear panel;

said liner bag being folded over said back rod being yieldably maintained by said second clamp;

said back rod being inside said storage bag and with said liner bag, adjacent and substantially parallel to said top edge of said rear panel;

said liner bag being folded over said front rod where it interconnects with said front panel so as to bring the opening of said liner bag in substantial coincidence with the opening of said storage bag defined by said upper edge of said front panel, said top edge of said rear panel and said top extremities of said first and second side means;

at least one of said clips being removably clamped over said front rod where it interconnects with said front panel with the liner bag folded thereover in order to secure said liner bag thereto.

7. A shaped storage bag as described by claim 6 further characterized by said top edge of said rear panel having a length less than said lower edge of said rear panel so that said rear panel can conform to a similarly shaped overhanging surface;

said back and front edges of said bottom being of substantially the same length as said lower edge of said rear panel;

said bottom edge of said front panel being substantially the same length as said lower edge of said rear panel and said upper edge of said front panel being of substantially the same length as said top edge of said rear panel;

said extraction opening comprising first and second slits, said first slit being parallel to and immediately adjacent the lower edge of said first side panels, said second slit being located parallel to, at the lower end of, and immediately adjacent the back edge of said first side panel, said first and second slits joining each other adjacent the corner defined by the back and bottom edges of said first side panel, said closure means comprising at least one zipper.

* * * * *